US006756108B2

(12) United States Patent
Chung

(10) Patent No.: US 6,756,108 B2
(45) Date of Patent: Jun. 29, 2004

(54) HEAT TRANSCRIPTION FILM AND MANUFACTURING METHOD THEREOF

(75) Inventor: Sook Hee Chung, Suwon-si (KR)

(73) Assignee: Korea Chemical Co., Ltd., Kyongki-do (KR)

( * ) Notice: Subject to any disclaimer, the term of this patent is extended or adjusted under 35 U.S.C. 154(b) by 434 days.

(21) Appl. No.: 10/007,905

(22) Filed: Nov. 7, 2001

(65) Prior Publication Data

US 2002/0150733 A1 Oct. 17, 2002

(30) Foreign Application Priority Data

Apr. 17, 2001 (KR) ........................................ 2001-20416
Jun. 22, 2001 (KR) ........................................ 2001-35921

(51) Int. Cl.[7] .......................... B32B 27/14; C08G 18/10

(52) U.S. Cl. .................. 428/195.1; 428/204; 427/407.1

(58) Field of Search .............................. 428/195.1, 204, 428/207, 208; 427/407.1, 409

(56) References Cited

U.S. PATENT DOCUMENTS 6,531,208 B2 * 3/2003 Chung ........................ 428/207

* cited by examiner

*Primary Examiner*—N. Edwards
(74) *Attorney, Agent, or Firm*—Merchant & Gould P.C.

(57) ABSTRACT

A heat transcription film comprising, a substrate film, a release agent layer formed on said substrate film, a color-ink printed layer formed on said release agent layer, a transparent-ink printed layer formed on said color-ink printed layer, a aluminum (Al) layer formed on said transparent-ink printed layer, and a partially bonded layer partially coated on said Al layer with a binder or adhesive in order to bind a predetermined object and partially show a color of said color-ink printed layer from the predetermined transcribed object.

16 Claims, 6 Drawing Sheets

HEAT TRANSCRIPTION FILM AND MANUFACTURING METHOD THEREOF

BACKGROUND OF THE INVENTION

1. Field of the Invention

The present invention relates to a technology for decorating a surface made of materials such as wood and plastic, and in particular, to a heat transcription film which is capable of showing various metallic patterns transcribed on a surface of an object together with inherent surface patterns of the object or of showing various metallic patterns transcribed on the surface of an object together with various colors printed on the object without damage of the transcribed object, and a manufacturing method thereof.

2. Description of the Conventional Art

Generally, in order to show metallic patterns on a frame, the surface of the frame is firstly processed (or preprocessed) by painting or transcribing a film, then a transcription film made of ink in which a pigment such as bronze or aluminum powders is added, or a transcription film having a metallic effect, is directly heat-transcribed to the surface of the frame.

For example, in order to show a metallic effect on a surface of a object such as a frame, furniture, and interior finish of buildings made of materials such as wood or synthetic resin, the first or second transcription is made on the surface of the transcribed object by use of a nonmetallic transcription film with a predetermined design, then the transcription film is heat-transcribed by a hot plate with desired characters or patterns.

But, the transcription film having a metallic effect should be peeled from the transcribed object in order to show colors on required parts of the transcribed object, because the transcription film covers colors on the surface resulting from the first surface treatment of the transcribed object.

A manufacturing method of a transcription film for showing a metallic effect on an object such as stationery or fancy goods is as follows:

A print manufactured as a release agent is coated on a polyester film with, metallic patterns is printed thereon in order to shown a partial deposition effect, a water-ink is printed on a part other than metallic patterns, and the polyester film is deposited. Then, the film deposited on a water-ink printed part is separated from the print together with the water-ink by rinsing. Therefore, there are only metallic patterns left on the print to show a partial deposition effect. Finally, after coating the print with an adhesive in a printing machine, the transcription film is manufactured.

However, the transcription film and its manufacturing method according to the prior art have problems as follows:

Problem 1

A metallic design of a transcription film using ink, which is made by mixing a pigment containing metallic powders, for example bronze or aluminum powders, cannot be used/seen for a long time, because a brightness of the pigment containing metallic powders fades quickly. In other words, surface colors of the transcribed object vary with time because physical properties of ink made by mixing a pigment containing metallic powders changed with time. Therefore, the products made by using the above transcription film are not of high quality, nor is their quality, even if high, maintained for a long time. Furthermore, the transcription film cannot be provided with various patterns.

Problem 2

A heat transcription film according to prior arts can show a metallic effect, but because it is covered on a first surface treatment color of a transcribed object made of materials such as wood, plastic, and aluminum, the first surface treatment color cannot be seen. Therefore, in order to show inherent color of the transcribed object, the heat transcription film should be partially separated from the object.

Problem 3

A hot stamping transcription film according to prior arts can be transcribed onto desired parts of a transcribed object with the use of a hot plate in which necessary letters or patterns are transcribed, but a transcribed object with various patterns cannot be manufactured because a roller cannot be designed with various patterns.

Problem 4

A deposited print according to the prior arts allows patterns to be transcribed on whole sides of a transcribed object, so that patterns of a printed film formed on a deposited layer obscure metallic patterns. Therefore, resulting products have a poor metallic effect. Furthermore, manufacturing expenses of the resulting transcribed object are increased because a transcription film with ink-printed patterns is firstly or secondly transcribed, and metallic patterns are made by additionally transcribing a separate layer to the transcribed object in manufacturing a transcribed object with a metallic effect.

Problem 5

In a method for manufacturing a transcription film for a partial metallic effect according to prior arts, a partial metallic effect deposited part A and a part B other than A are deposited with metals, and the part B should be peeled. In other words, the method for manufacturing a transcription film further comprises a rinse step. Therefore, the method suffers from a complicated process, long working hours, high manufacturing costs, and environmental pollution due to a wastewater from the rinse process.

Problem 6

A method for manufacturing a transcribed object equipped with a metallic foil, manufactured by transcribing the metallic foil to a transcribed object such as clothes, comprising the steps of combining a deposited transcription film and clothes according to prior arts, aging them for 24 hours or more and curing them, and eliminating the cured, deposited transcription film from clothes.

However, the method has disadvantages in that the process is complicated and large, intricate patterns cannot be obtained.

SUMMARY OF THE INVENTION

It is an object of the invention to provide a heat transcription film that can show various metallic patterns with a base color or patterns of a transcribed object, or with various colors printed on the transcribed object without causing damage to the transcribed object, and a method for manufacturing the same.

It is another object of the invention to provide a heat transcription film that can be bonded to a transcribed object by heat and pressure applying means, and show various metallic patterns with a base color of the transcribed object, and a method for manufacturing the same.

Furthermore, it is another object of the invention to provide a heat transcription film that can be bonded to a transcribed object by heat and pressure applying means, and show various colored metallic patterns with various colors printed on the transcribed object, and a manufacturing method thereof.

In order to accomplish the object of the present invention, there is provided a heat transcription film comprising, a substrate film, a release agent layer formed on said substrate film, a color-ink printed layer formed on said release agent layer, a transparent-ink printed layer formed on said color-ink printed layer, a aluminum (Al) layer formed on said transparent-ink printed layer, and a partially bonded layer partially coated on said Al layer with a binder or adhesive in order to bind a predetermined object and partially show a color of said color-ink printed layer from the predetermined transcribed object.

The above objects could be also accomplished by further comprising a printed layer between the partially bonded layer and a transcribed object.

In order to accomplish the object of the present invention, there is provided a method for manufacturing the heat transcription film comprising the steps of: forming a release agent layer on a predetermined substrate film; forming a color-ink printed layer on said release agent layer; forming a transparent-ink printed layer on said color-ink printed layer; depositing an Al layer on said transparent-ink printed layer; and forming a partially bonded layer partially coated on a portion of said Al layer in order to bond to a predetermined transcribed object and show a color of said color-ink printed layer.

The above objects could be also accomplished by further comprising forming a printed layer between a partial bonded layer and a transcribed object.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

A better understanding of the present invention may be obtained with reference to the accompanying drawings, which are not to be construed to limit the present invention.

Figure 1A:
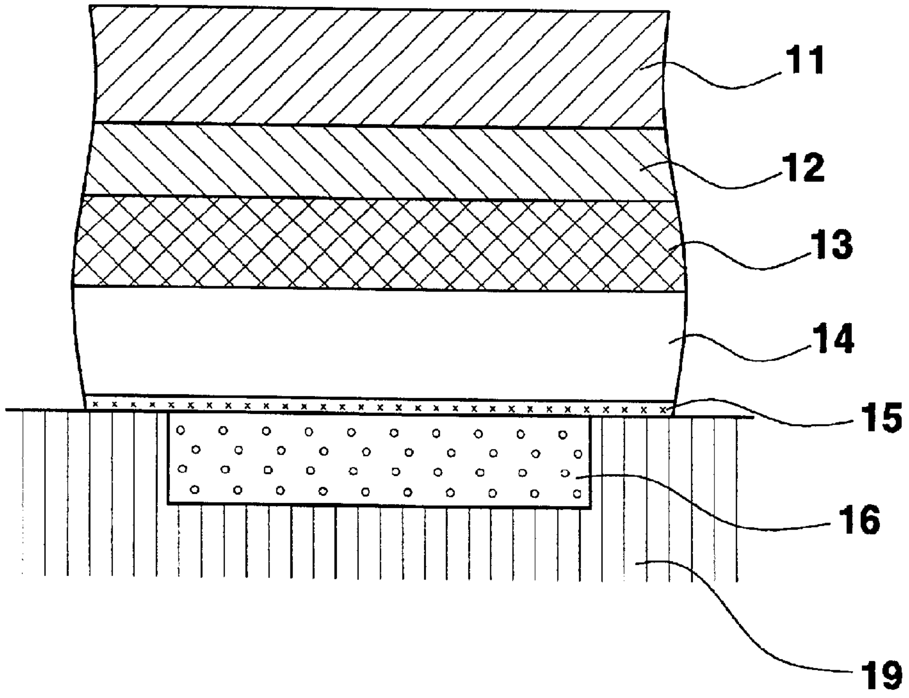
FIG. 1A is a cross sectional view of a heat transcription film with a transparent effect according to a first embodiment of the invention.
Figure 1B:
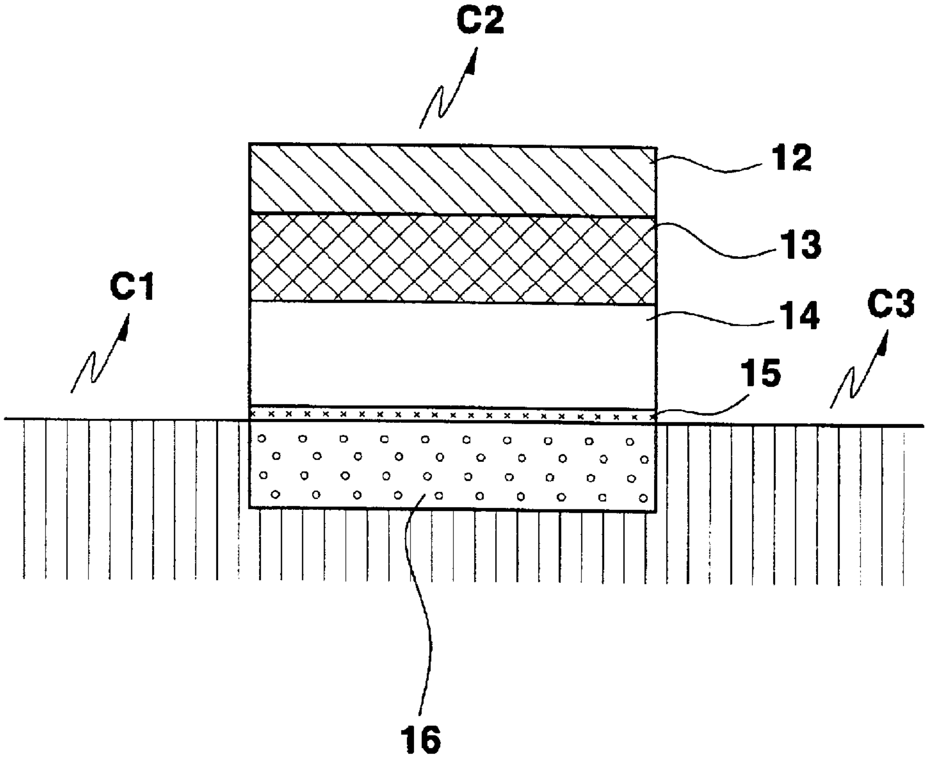
FIG. 1B is a cross sectional view of a transcribed object onto which a heat transcription film with a transparent effect is coated according to a first embodiment of the invention.

FIG. 1A is a cross sectional view of a heat transcription film with a transparent effect according to the first embodiment of the invention. The heat transcription film comprises a anti-reflection substrate film 11; a release agent layer 12 coated with a mixture of acrylic resin (MMA) and a solvent such as ketones, acetates, aromatics on the substrate film 11; a color-ink printed layer 13 coated with a mixture of a resin such as acrylic or vinyl, a solvent such as ketones, acetates or aromatics, a pigment and a dye on the release agent layer 12; a transparent-ink printed layer 14 coated with a mixture of a resin having a excellent heat resistance such as DAP, acrylic, acrylic urethane or nitrocellulose, a solvent such as ketones, acetates or aromatics, a pigment and a curing agent on the color-ink printed layer 13; an Al deposited layer 15 in which Al is deposited under vacuum on the transparent-ink printed layer 14; and a partial bonded layer 16 coated with a mixture of a resin such as acrylics, vinyl, or polyesters, and a solvent such as ketones, acetates, or aromatics on the Al layer 15 in order to bond the Al deposited layer to the transcribed object.

The substrate film 11 may be a polyester film of 12 to 25 μm thickness having light and heat stability, which is coated with an anti-reflection agent.

The heat transcription film with a transparent effect as the above structure is bonded to a transcribed object 19, as shown in FIG. 1A.

Figure 2:
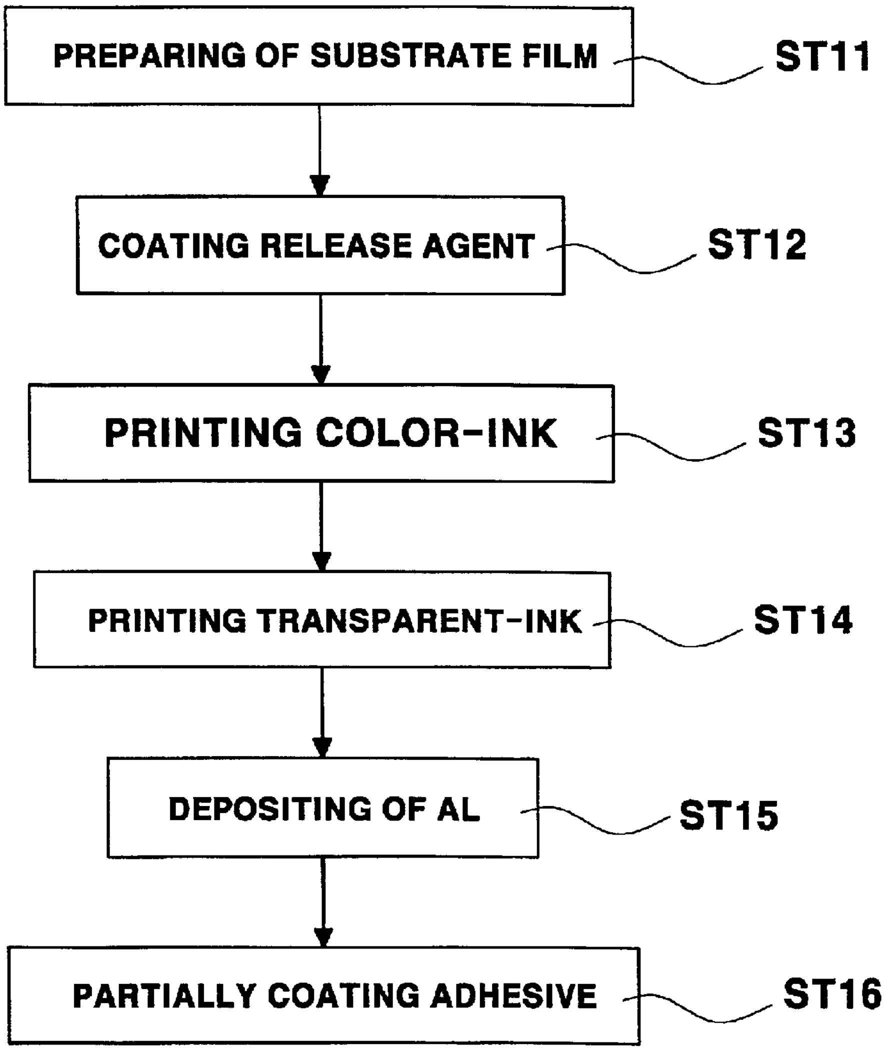
FIG. 2 is a flow chart illustrating a method for manufacturing a heat transcription film with a transparent effect of FIG. 1A.

FIG. 2 is a flow chart illustrating a method for manufacturing the heat transcription film with a transparent effect of FIG. 1A.

Firstly, an anti-reflection substrate film 11 is prepared by coating a polyester film having light and heat stability with an anti-reflection agent ST 11. A release agent layer 12 is formed by coating the substrate film with a mixture of a resin, mainly consisting of acryl, and a solvent, such as ketones, acetates, or aromatics ST 12. Afterward, a color-ink printed layer is formed by coating the release agent layer 12 with a mixture of a resin, such as acrylics or vinyl, a solvent, such as ketones, acetates, or aromatics, a pigment, and a dye ST 13.

Formed between the substrate film 11 and the color-ink printed layer 13 with the use of 10 to 20 g of a resin, the release agent layer 12 is a strippable layer.

In order to provide a transparent effect, a transparent-ink printed layer 14 is formed by coating the color-ink printed layer 13 with a mixture of a resin having a excellent heat resistance such as DAP, acrylics, acrylic urethanes or nitrocellulose, a solvent such as ketones, acetates or aromatics, a pigment and a curing agent, ST 14. Then, a Al deposited layer 15 in which Al is deposited under vacuum is formed on the transparent-ink printed layer 14 in order to provide a metallic effect ST 15.

Finally, the heat transcription film with a transparent effect of the invention can be manufactured by coating a portion of the Al deposited layer 15 with a mixture of a resin, such as acrylics, vinyls, or polyesters, and a solvent, such as ketones, acetates, or aromatics, in order to bond a portion of the Al deposited layer 15 to the transcribed object 19.

Accordingly, the heat transcription film with a transparent effect as described above can show a metallic-pattern on a predetermined portion C2 and inherent color or patterns of a transcribed object C1 by heat-transcribing the heat transcription film to the transcribed object 19 such as a frame made of wood, plastic, aluminum, followed by separating the heat transcription film from the transcribed object 19.

According to an embodiment of the invention, the heat transcription film with a transparent effect may be bonded to the transcribed object 19 by pressing with a pressure roller, for example a synthetic rubber roller at 130° C. at a speed of 3 to 5 m/min (a transcription temperature and speed depend on a kind of a transcribed object).

Figure 3A:
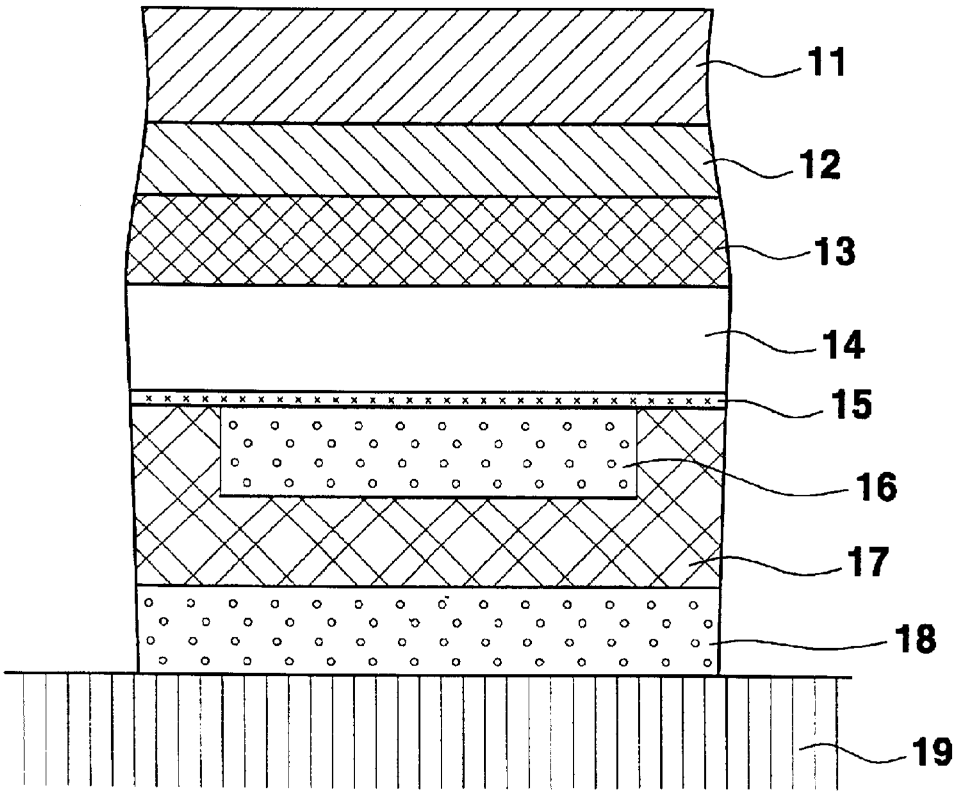
FIG. 3A is a cross sectional view of a heat transcription film with various color effect according to a second embodiment of the invention.

FIG. 3A is a sectional view of a heat transcription film with various color effect according to the second embodiment of the invention. The heat transcription film with various color effect further comprises a printed layer 17 and a bonded layer other than the heat transcription film with a transparent effect comprising the substrate film 11, the release agent layer 12, the color-ink printed layer 13, the transparent-ink printed layer 14, the Al deposited layer 15 and the partially bonded layer 16 as shown in FIG. 1A.

A method for manufacturing the heat transcription film with various color effect will be described in detail in conjunction with FIG. 4.

Figure 4:
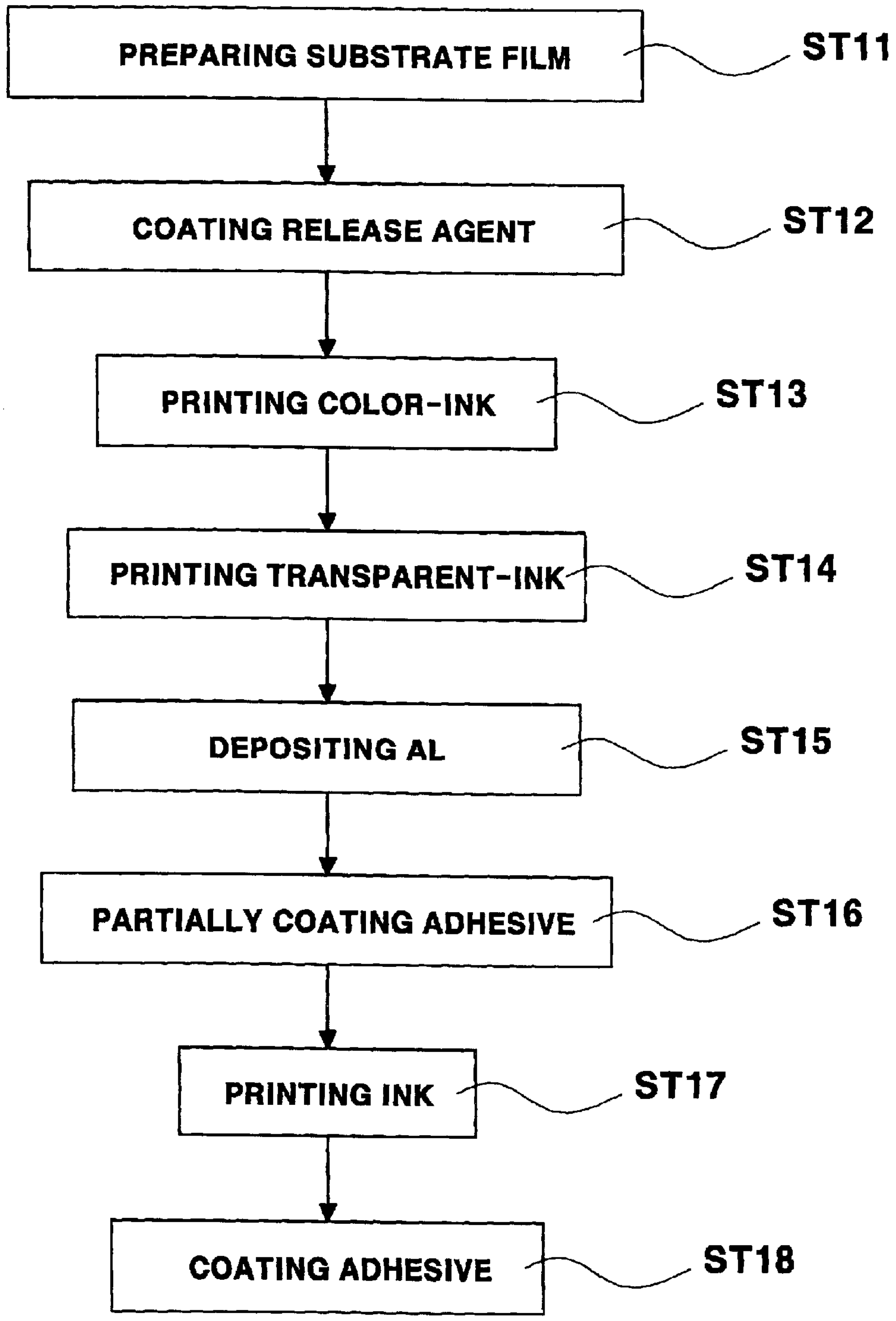
FIG. 4 is a flow chart illustrating a method for manufacturing a heat transcription film with various color effect of FIG. 3A.

FIG. 4 is a flow chart illustrating a method for manufacturing the heat transcription film with various color effect of FIG. 3A. In a method for manufacturing the heat transcription film with various color effect, the steps of manufacturing the substrate film 11 ST 11, forming the release agent layer 12 ST 12, printing the color-ink ST 13 and the transparent-ink ST 14, depositing Al under vacuum ST 15, and coating the partial adhesive ST 16 are same as the method for manufacturing the heat transcription film with a transparent effect as shown in FIG. 2.

According to the second embodiment of the invention, the heat transcription film with various color effect may be manufactured by forming the partially bonded layer 16, forming the printed layer 17 through printing ink on the Al deposited layer 15 and the partial bonded layer 16 ST 17, forming the bonded layer 18 through coating the printed layer 17 with an adhesive in order to bond the printed layer 17 to the transcribed object 19 ST 18.

An ink of the printed layer 17 is manufactured by mixing a resin such as acrylics or vinyls, a solvent such as ketones, acetates, or aromatics, a small amount of an additive and a pigment.

The bonded layer 18 made of the adhesive comprises of acrylic MMA as a main component.

Figure 3B:
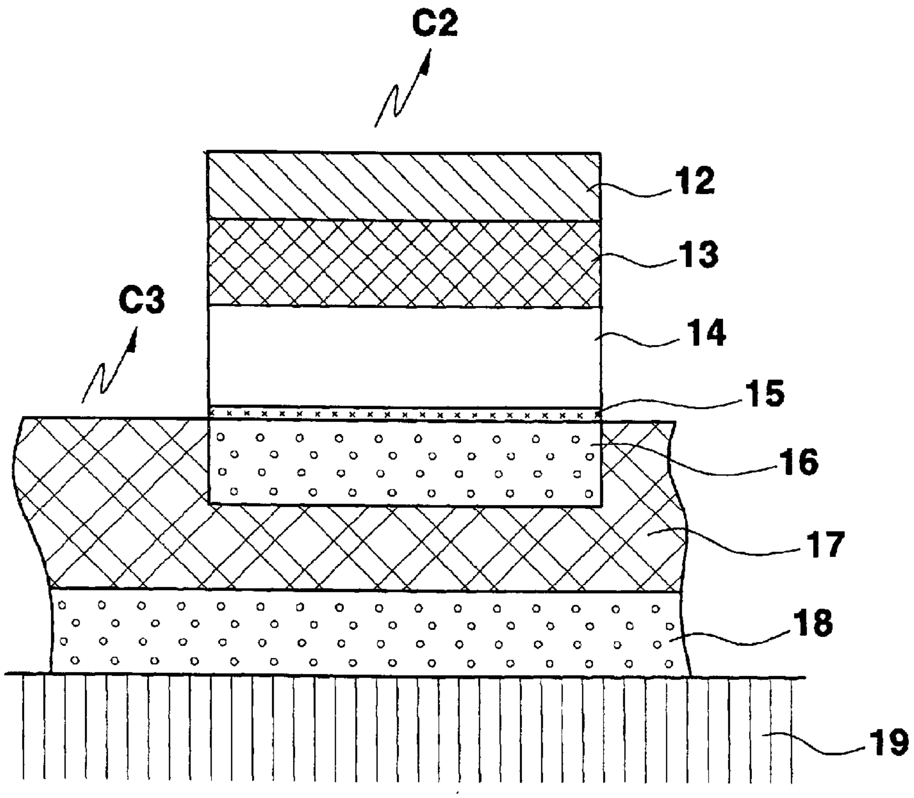
FIG. 3B is a cross sectional view of a transcribed object onto which a heat transcription film with various colors effect is coated according to a second embodiment of the invention.

The heat transcription film with various color effect as described above can show a metallic-pattern portion C2 and various color portion of a transcribed object C3 by heat-transcribing the heat transcription film to the transcribed object 19, followed by separating the heat transcription film from the transcribed object 19 as shown in FIG. 3B.

The heat transcription film with various color effect may be bonded to the transcribed object by heating and pressing with a pressure roller at 130° C. at a speed of 3 to 5 m/min (a transcription temperature and speed depend on a kind of a transcribed object).

The heat transcription film with a transparent effect can show a metallic-pattern and a transparent effect simultaneously by surface decorating, for example, the transcribed object such as a frame, furniture, interior finish of buildings made of materials such as woods, plastics, aluminum with the use of paints; dry bonding the heat transcription film with a transparent effect of the invention to the transcribed object of which a surface is treated; followed by separating the film from the transcribed object with the use of heat and pressure of a synthetic rubber roller, in order to show a base color of the transcribed object with partial metallic patterns.

Furthermore, a heat transcription film of the invention can show various color effect by dry bonding the heat transcription film to various products such as a frame, furniture, interior finish of buildings, stationery, PVC floor paper, fancy goods, money, a negotiable instrument, a sign board, paper, cloth made of woods or synthetic resin moldings with the use of heat and pressure of a synthetic rubber roller, followed by separating the heat transcription film from products.

As described above, a heat transcription film for transparent or various color effect of the invention has advantages in that the film can be manufactured by a simple process and at a low cost, and can show various, splendid patterns.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A heat transcription film comprising:

a substrate film;

a release agent layer formed on said substrate film;

a color-ink printed layer formed on said release agent layer;

a transparent-ink printed layer formed on said color-ink printed layer;

a aluminum (Al) layer formed on said transparent-ink printed layer; and a partially bonded layer partially coated on said Al layer with a binder or adhesive in order to bind a predetermined object and partially show a color of said color-ink printed layer from the predetermined transcribed object.

2. The heat transcription film according to claim 1, wherein said substrate film is a anti-reflection polyester film.

3. The heat transcription film according to claim 1, wherein said release agent layer comprises a mixture of a solvent, such as ketones, acetates, or aromatics, and an acrylic resin.

4. The heat transcription film according to claim 1, wherein said color-ink printed layer comprises a mixture of a resin, such as acryls or vinyl, a solvent, such as ketones, acetates or aromatics, a pigment, and a dye.

5. The heat transcription film according to claim 1, wherein said transparent-ink printed layer comprises a mixture of a resin, such as DAP, acryls, acrylic urethane, or nitrocellulose, a solvent, such as ketones, acetates, or aromatics, a pigment, and a curing agent.

6. The heat transcription film according to claim 1, wherein said Al layer is formed by deposition on the transparent-ink printed layer.

7. The heat transcription film according to claim 1, wherein said partially bonded layer comprises a mixture of a resin, such as acryls or vinyls, a solvent, such as ketones, acetates, or aromatics.

8. The heat transcription film according to claim 1, wherein a part of the layers other than said partially bonded layer and said layers vertically formed together with said partially bonded layer and said substrate film are separated from said transcribed object.

9. The heat transcription film according to claim 1 further comprising the printed layer between said partially bonded layer and said transcribed object.

10. The heat transcription film according to claim 9, wherein said printed layer comprises a mixture of a resin, such as acryls or vinyls, a solvent, such as ketones, acetates, or aromatics, an additive, and a pigment.

11. The heat transcription film according to claim 9, wherein said printed layer further comprises the bonded layer in order to be bonded to said transcribed object.

12. The heat transcription film according to claim 11, wherein said bonded layer is an adhesive comprising acryls as a main component.

13. The heat transcription film according to claim 9, wherein a part of the layers other than said partially bonded layer and said layers vertically formed together with said partially bonded layer and said substrate film are separated from said printed layer of said transcribed object.

14. A method for manufacturing the heat transcription film comprising the steps of:

forming a release agent layer on a predetermined substrate film;

forming a color-ink printed layer on said release agent layer;

forming a transparent-ink printed layer on said color-ink printed layer;

depositing an Al layer on said transparent-ink printed layer; and forming a partially bonded layer partially coated on a portion of said Al layer in order to bond to a predetermined transcribed object and show a color of said color-ink printed layer.

15. The method according to claim 14, wherein said manufacturing method further comprising forming a printed layer in order to show a different color from said transcribed object.

16. The method according to claim 15, wherein said manufacturing method further comprising coating an adhesive on said printed layer in order that said printed layer is bonded to said transcribed object.

* * * * *